United States Patent
Piazzi et al.

(10) Patent No.: US 10,567,052 B2
(45) Date of Patent: *Feb. 18, 2020

(54) APPARATUS AND METHOD TO CONFIGURE ANTENNA BEAM WIDTH

(71) Applicant: Futurewei Technologies, Inc., Plano, TX (US)

(72) Inventors: Leonard Piazzi, Denville, NJ (US); Renjian Zhao, Acton, MA (US); Zhengxiang Ma, Summit, NJ (US); Stefan Feuchtinger, Munich (DE)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/251,276

(22) Filed: Jan. 18, 2019

(65) Prior Publication Data
US 2019/0158159 A1 May 23, 2019

Related U.S. Application Data

(63) Continuation of application No. 14/624,430, filed on Feb. 17, 2015, now Pat. No. 10,187,130.

(51) Int. Cl.
*H04B 7/0456* (2017.01)
*H04B 7/0452* (2017.01)
(Continued)

(52) U.S. Cl.
CPC ........... *H04B 7/0456* (2013.01); *H01Q 1/246* (2013.01); *H01Q 3/26* (2013.01); *H01Q 21/24* (2013.01);
(Continued)

(58) Field of Classification Search
CPC .. H04B 7/0617; H04B 7/0408; H04B 7/0456; H04B 7/0452; H04B 7/0469;
(Continued)

(56) References Cited

U.S. PATENT DOCUMENTS 10,187,130 B2 * 1/2019 Piazzi ................. H04B 7/0456
2008/0102760 A1 5/2008 McConnell et al.
(Continued)

FOREIGN PATENT DOCUMENTS

CN 102273013 A 12/2011
CN 103733542 A 4/2014
(Continued)

OTHER PUBLICATIONS

Ng, B., et al., "Fulfilling the Promise of Massive MIMO With 2D Active Antenna Array," IEEE Globecom Workshops, Dec. 3-7, 2012, pp. 691-696.
(Continued)

*Primary Examiner* — George Eng
*Assistant Examiner* — Jing Gao
(74) *Attorney, Agent, or Firm* — Slater Matsil, LLP (57) ABSTRACT

Using High-beam and low-beam transmission signals that have different antenna tilts, different beam-widths, and different polarizations than one another may provide performance advantages in wireless networks. The high-beam transmission signal and the low-beam transmission signal may have orthogonal polarizations. For example, the high-beam transmission signal and the low-beam transmission signal may be linearly polarized signals having different electromagnetic field (E-field) polarization angles with respect to the y-axis, e.g., +/−forty-five degrees with respect to a vertically polarized wave. As another example, the high-beam transmission signal may be a vertically polarized signal, and the low-beam transmission signal may be a horizontally polarized signal, or vice-versa. In addition to having orthogonal polarizations, the low-beam transmission signal may have a greater antenna beam down-tilt angle, and a wider beam-width than the high-beam transmission signal.

21 Claims, 8 Drawing Sheets (51) Int. Cl.
- *H01Q 1/24* (2006.01)
- *H01Q 3/26* (2006.01)
- *H01Q 21/24* (2006.01)
- *H01Q 25/00* (2006.01)
- *H04B 7/10* (2017.01)
- *H04B 7/06* (2006.01)
- *H01Q 3/04* (2006.01)
- *H04W 88/08* (2009.01)

(52) U.S. Cl.
CPC ......... *H01Q 25/001* (2013.01); *H04B 7/0452* (2013.01); *H04B 7/0469* (2013.01); *H04B 7/0617* (2013.01); *H04B 7/10* (2013.01); *H01Q 3/04* (2013.01); *H04W 88/08* (2013.01)

(58) Field of Classification Search
CPC ...... H04B 7/2041; H04B 7/10; H04B 7/0413; H04B 7/086; H04B 17/391; H04B 1/04; H04B 2001/045; H01Q 3/26; H01Q 21/24; H01Q 25/001; H01Q 1/246; H04W 16/28; H04W 24/02; H04L 5/14
See application file for complete search history.

(56) References Cited

U.S. PATENT DOCUMENTS

| | | |
|---|---|---|
| 2009/0058725 A1 | 3/2009 | Barker et al. |
| 2010/0048218 A1 | 2/2010 | Gale et al. |
| 2010/0227647 A1 | 9/2010 | Shimizu et al. |
| 2010/0311353 A1 | 12/2010 | Teillet et al. |
| 2011/0103504 A1* | 5/2011 | Ma .................. H04B 7/0417 375/267 |
| 2013/0171998 A1 | 7/2013 | Liu et al. |
| 2014/0211731 A1 | 7/2014 | Inoue et al. |
| 2015/0078472 A1 | 3/2015 | Vook et al. |
| 2016/0028455 A1 | 1/2016 | Ma et al. |
| 2016/0183275 A1 | 6/2016 | Inoue et al. |

FOREIGN PATENT DOCUMENTS

| | | | |
|---|---|---|---|
| CN | 104335505 A | 2/2015 | |
| WO | 2013066220 A1 | 5/2013 | |
| WO | 2013144361 A1 | 10/2013 | |
| WO | WO-2013144361 A1 * | 10/2013 | ........... H04B 7/0617 |
| WO | 2014182383 A1 | 11/2014 | |
| WO | 2015019776 A1 | 2/2015 | |
| WO | 2016015549 A1 | 2/2016 | |

OTHER PUBLICATIONS

Zhang Lingpei et al., "The Adaptive Beam Forming Algorithm Based on MIMO Array with Particle Swarm Optimization," Educational and Information Technology (ICEIT), 5 pages, XP31779153, 2010 International Conference, Shanxi, China.

* cited by examiner

APPARATUS AND METHOD TO
CONFIGURE ANTENNA BEAM WIDTH

This application is a continuation of U.S. patent application Ser. No. 14/624,430, filed on Feb. 17, 2015 and entitled "Apparatus and Method to Configure Antenna Beam Width," which application is hereby incorporated by reference herein as if reproduced in its entirety.

TECHNICAL FIELD

The present invention relates to telecommunications, and, in particular embodiments, to an apparatus and method to configure antenna beam width.

BACKGROUND

In cross-polarized antennas systems for wireless or cellular communications, such as for Long Term Evolution (LTE), the antenna is designed to emit two cross-polarized radio frequency (RF) beams at +45° and −45° polarization respectively. Further, the two polarizations are set to the same down tilt angle, for example 8° for each of the two polarized beams. To ensure proper multiple-input and multiple-output (MIMO) operation, multiple cross-polarized antennas need to have the same coverage, which is significantly impacted by their down tilt angles. However, the current setup of the cross-polarized antennas, with a fixed down tilt angle of the two polarized beams, does not offer any MIMO or beamforming functionality in the elevation dimension. There is a need for an improved cross-polarized antennas design that provides versatile functionality for MIMO or beamforming in general, such as versatile elevation or three-dimensional coverage.

SUMMARY OF THE INVENTION

Technical advantages are generally achieved, by embodiments of this disclosure which describe an apparatus and method to configure antenna beam width.

In accordance with an embodiment, a method for performing polarized transmissions is provided. In this example, the method includes generating two signals, obtaining a low-beam signal and a high-beam signal by applying different beamforming weight vectors to the two signals, and transmitting the low-beam signal and the high-beam signal over different polarizations of an antenna array to emit a low-beam transmission signal and a high-beam transmission signal. In this example, the high-beam transmission signal has a different antenna tilt, a different beam-width, and a different polarization than the low-beam transmission signal. An apparatus for performing this method is also provided.

In accordance with another embodiment, access point (AP) for performing polarized transmissions is provided. In this example, the AP comprises an antenna array, and a radio transmitter coupled to the antenna array. The radio transmitter is adapted to apply different beamforming weight vectors to two signals to obtain a low-beam signal and a high-beam signal, and to transmit the low-beam signal and the high-beam signal over different polarizations of an antenna array to emit a low-beam transmission signal and a high-beam transmission signal. In this example, the high-beam transmission signal has a different antenna tilt, a different beam-width, and a different polarization than the low-beam transmission signal.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

A cross polarized antenna system that produces high-beam and low-beam transmission signals having different antenna beam down tilt angles and different polarizations is discussed in U.S. patent application Ser. No. 14/609,251 filed Jan. 29, 2015 and entitled "Apparatus and Methods for Cross-Polarized Tilt Antennas," which is incorporated by reference herein as if reproduced in its entirety.

Aspects of this disclosure expand on that concept by using different beam-widths for the high-beam and low-beam transmission signals, thereby producing high-beam and low-beam transmission signals that have different antenna tilts, different beam-widths, and different polarizations than one another. The high-beam transmission signal and the low-beam transmission signal may have orthogonal polarizations. For example, the high-beam transmission signal and the low-beam transmission signal may be linearly polarized signals having different electromagnetic field (E-field) polarization angles with respect to the y-axis, e.g., +/−forty-five degrees with respect to a vertically polarized wave. As another example, the high-beam transmission signal may be a vertically polarized signal, and the low-beam transmission signal may be a horizontally polarized signal, or vice-versa. In other examples, the high-beam and low-beam transmission signals may be circularly or elliptically polarized signals having right-hand and left-hand electromagnetic field (E-field) polarizations. In addition to having orthogonal polarizations, the low-beam transmission signal may have a greater antenna beam down-tilt angle, and a wider beam-width than the high-beam transmission signal. For instance, the low-beam transmission signal may have a fourteen degree antenna beam down-tilt angle and an eight degree beam-width, while the high-beam transmission signal may have an eight degree down-tilt angle and a four degree beam-width. Other combinations are also possible. Additional performance enhancements may be achieved by performing upper side-lobe suppression on the low-beam signal, and lower side-lobe suppression on the high-beam signal. In particular, performing side-lobe suppression on the respective high-beam and low-beam transmission signals may provide significant performance advantages in multi-user multiple-input-multiple-output (MU-MIMO) implementations. Also, the high beam and low beam pattern may be optimized for different targets, e.g. the high beam may be optimized for maximum gain and directivity, while the low beam may be optimized for minimum interference with the high beam. These and other aspects are described in greater detail below.

Figure 1:
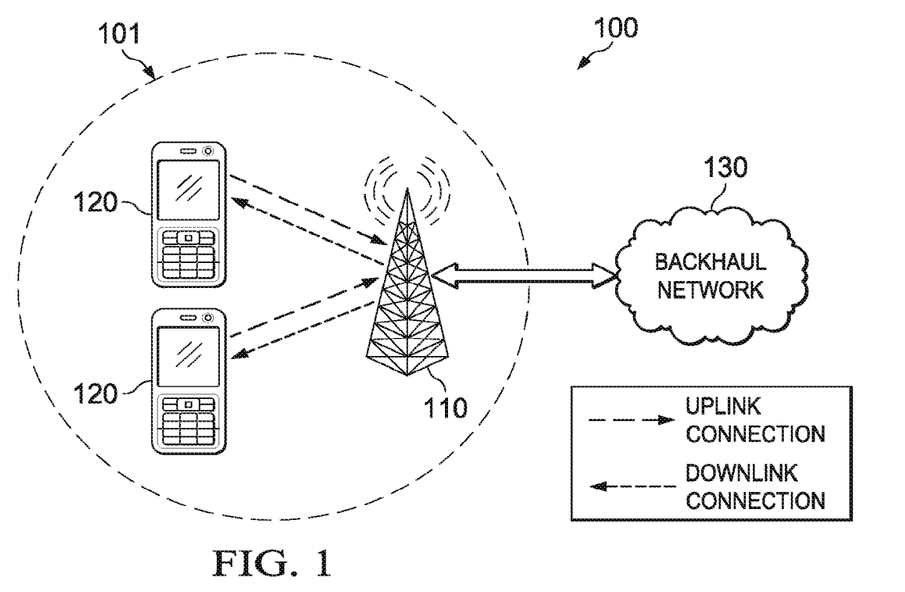
FIG. 1 illustrates a diagram of an embodiment wireless communications network.

FIG. 1 illustrates a network 100 for communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

Figure 2:
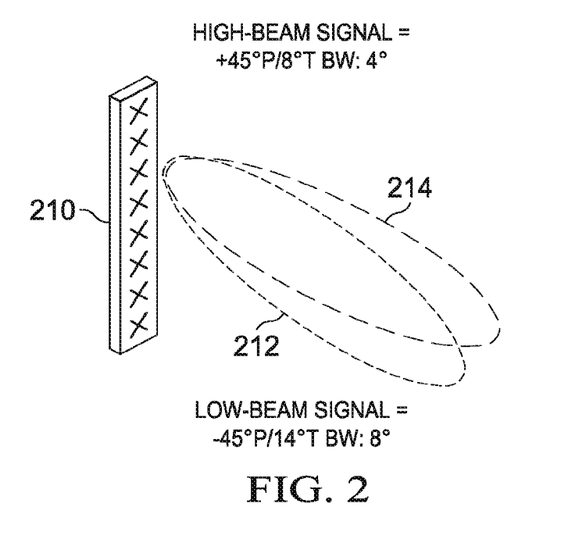
FIG. 2 illustrates a diagram of an embodiment cross-polarized antenna for producing high-beam and low-beam transmission signals having different antenna tilts, beam-widths, and polarizations than one another.

Aspects of this disclosure provide techniques for producing high-beam and low-beam transmission signals that have different antenna tilts, different beam-widths, and different polarizations than one another. FIG. 2 illustrates a diagram of an embodiment cross-polarized antenna 210 for producing high and low beam transmission signals. As shown, the embodiment cross-polarized antenna 210 may produce a low-beam transmission signal 212 and a high-beam transmission signal 214. The low-beam transmission signal 212 has a different antenna tilt, a different beam-width, and a different polarization than the high-beam transmission signal 212. In some implementations, it may be desirable for the low-beam transmission signal 212 and the high-beam transmission signal 214 to have linearly orthogonal polarizations, with the low-beam transmission signal 212 having more antenna down-tilt and a wider beam-width than the high-beam transmission signal 214. In the exampled depicted by FIG. 2, the low-beam transmission signal 212 comprises a negative forty-five degree polarization, a fourteen degree antenna down-tilt, and an eight degree beam-width, while the high-beam transmission signal 214 comprises a positive forty-five degree polarization, an eight degree antenna down-tilt, and a four degree beam-width. Other combinations are also possible.

Notably, the low-beam transmission signal 212 and the high-beam transmission signal 214 may have any polarization, so long as their respective polarizations are different than one another. For instance, the low-beam transmission signal 212 and the high-beam transmission signal 214 may have orthogonal polarizations, quasi-orthogonal polarizations, or non-orthogonal polarizations with respect to one another. In one embodiment, the low-beam transmission signal 212 and the high-beam transmission signal 212 are linearly polarized signals having different electromagnetic field (E-field) polarization angles with respect to the x-axis/y-axis. In one example (as depicted in FIG. 2), the low-beam transmission signal 212 and the high-beam transmission signal 214 have negative/positive forty-five degree polarization angles with respect to the y-axis. In another example, the low-beam transmission signal 212 and high-beam transmission signals 214 have respective horizontal and linear polarizations, or vice versa. In other embodiments, the low-beam transmission signal 212 and the high-beam transmission signal 214 are circularly or elliptically polarized signals having different electromagnetic field (E-field) polarization angles with respect to the x-axis and the y-axis at a given point in space and time. For example, the low-beam transmission signal 212 and the high-beam transmission signal 214 may be circularly polarized signals having orthogonal right-hand and left-hand polarizations. As discussed herein, the y-axis corresponds to a vertically polarized wave, and the x-axis corresponds to a vertically polarized wave.

Additionally, the low-beam transmission signal 212 and the high-beam transmission signal 214 may have any beam-width, so long as their respective beam-widths are different. For purposes of this disclosure, the term "beam-width" refers to an angle between negative three decibel (−3 dB) points of the main lobe of the respective transmission signal. Moreover, the phrase "different beam-widths" refers to signals that are purposefully transmitted with different beam-widths, and should not be interpreted to include transmission signals that incidentally have different beam-widths as a result of transmitter calibration, manufacturing tolerance, etc. In one example, the beam-width of the low-beam transmission signal 212 is at least one-degree wider than the beam-width of the high-beam transmission signal 214. In yet another example, the beam-width of the low-beam transmission signal 212 is at least fifty percent wider than the beam-width of the high-beam transmission signal 214. In yet another example, the beam-width of the low-beam transmission signal 212 is at twice as wide as the beam-width of the high-beam transmission signal 214.

Lastly, the low-beam transmission signal 212 and the high-beam transmission signal 214 may have any antenna-tilt, so long as their respective antenna-tilts differ. In this disclosure, the term "antenna-tilt" refers to an angular direction in which the main-lobe of the transmission signal is aimed. Antenna-tilt may be achieved electrically or mechanically. In some embodiments, the low-beam transmission signal 212 has more antenna down-tilt than the high-beam transmission signal 214. For example, an antenna down-tilt of the low-beam transmission signal 212 may be at least three degrees greater than an antenna down-tilt of the high-beam transmission signal 214. In another example, the antenna down-tilt of the low-beam transmission signal 212 may be at least six degrees greater than an antenna down-tilt of the high-beam transmission signal 214. In other embodiments, the low-beam transmission signal 212 has an antenna down-tilt (e.g., the main lobe is aimed below the horizontal plane), while the high-beam transmission signal 214 has an antenna up-tilt (e.g., the main lobe is aimed above the horizontal plane). In yet other embodiments, the low-beam transmission signal 212 has less antenna up-tilt than the high-beam transmission signal 214.

Figure 3:
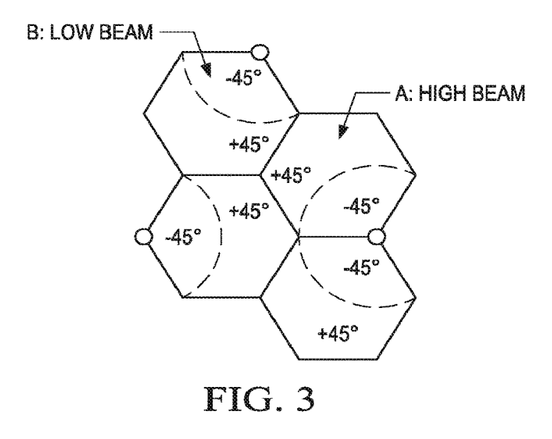
FIG. 3 illustrates a diagram of a coverage scheme for embodiment low-beam and high-beam transmissions.

FIG. 3 illustrates a diagram of an embodiment coverage scheme for high-beam and low-beam transmission signals. The coverage areas represent an example of cell layout for low-beam and high-beam transmission signals, which may be produced using different precoding matrix indicators (PMIs).

Figure 4:
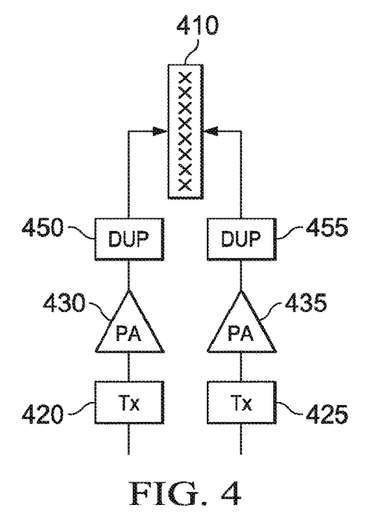
FIG. 4 illustrates a diagram of an embodiment transmitter for performing low-beam and high-beam transmissions.

Aspects of this disclosure provide embodiment transmitters for performing high-beam and low-beam transmissions. FIG. 4 illustrates a diagram of an embodiment transmitter 400 for transmitting high-beam and low-beam transmission signals. As shown, the embodiment transmitter 400 includes a cross-polarized antenna 410, radio frequency (RF) transmitters 420, 425, power amplifiers (PAs) 430, 435, and duplexers (DUPs) 450, 455. The RF transmitter 420, PA 430, and DUP 450 may be adapted to produce the low-beam signal, while the RF transmitter 425, PA 435, and DUP 455 may be adapted to produce the high-beam signal. The respective low-beam signal and the high-beam signal may thereafter be transmitted over different polarizations (e.g., poles) of the cross-polarized antenna 410 to emit a low-beam transmission signal and a high-beam transmission signal, respectively, that have different antenna tilts, beam-widths, and polarizations. While much of this disclosure discuss performing high-beam and low-beam transmissions over cross-polarized antennas, those of ordinary skill in the art will understand that other types of antennas may be used to perform the high-beam and low-beam transmissions. For instance, vertically and horizontally polarized antennas may be used to produce linearly polarized orthogonal high-beam and low-beam transmission signals. As another example, right-hand and left-hand circularly polarized antennas may be used to produce circularly polarized orthogonal high-beam and low-beam transmission signals. Antennas adapted to produce elliptically polarized signals may also be used. In some embodiments, the high-beam and low-beam transmission signals have substantially orthogonal polarizations. In other embodiments, the polarizations are quasi-orthogonal.

Figure 5:
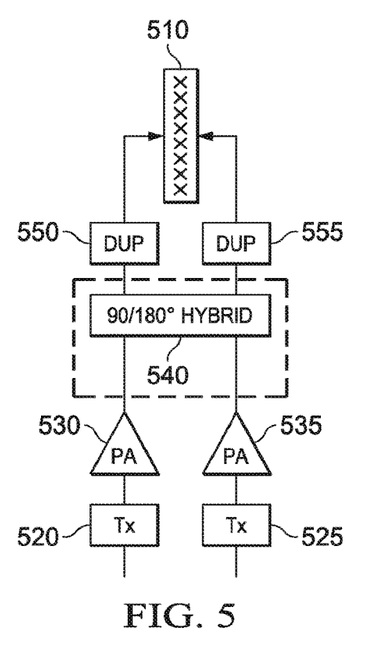
FIG. 5 illustrates a diagram of another embodiment transmitter for performing low-beam and high-beam transmissions.

In some embodiments, a hybrid coupler may be included in a transmitter to equalize the coverage of baseband ports driving the RF transmitters, which may allow power sharing between the PAs such that each PA can be directed at either signal. FIG. 5 illustrates a diagram of an embodiment transmitter 500 for transmitting high-beam and low-beam transmission signals. As shown, the embodiment transmitter 500 includes a cross-polarized antenna 510, RF transmitters 520, 525, PAs 530, 535, a hybrid coupler 540, and DUPs 550, 555. The cross-polarized antenna 510, RF transmitters 520, 525, PAs 530, 535, and DUPs 550, 555 of the embodiment transmitter 500 may be substantially similar to like components of the embodiment transmitter 400. The hybrid coupler 540 may be configured to allow power sharing between the PAs 530, 535 such that any portion of the cumulative power output of the PA can be directed at either the low-beam signal or the high-beam signal. For example, the entire power output of the PA 535, and half the power output of the PA 530, may be directed at the high-beam signal, while the other half of the power output of the PA 530 is directed at the low-beam signal. This may allow the high-beam signal to have a higher transmit power level than would otherwise be attainable without the power-sharing capability provided by the hybrid coupler 540.

Figure 6:
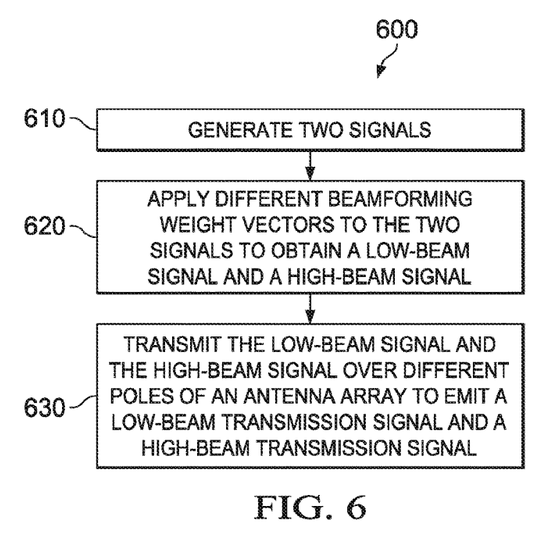
FIG. 6 illustrates a flowchart of an embodiment method for performing low-beam and high-beam transmissions.

Aspects of this disclosure provide methods for transmitting high-beam and low-beam transmission signals. FIG. 6 illustrates a flowchart of an embodiment method 600 for transmitting high-beam and low-beam transmission signals, as may be performed by a transmitter. As shown, the embodiment method 600 begins at step 610, where the transmitter generates two signals. Thereafter, the embodiment method 600 proceeds to step 620, where the transmitter applies different beamforming weight vectors to the two signals to obtain a low-beam signal and a high-beam signal. The beamforming weight vectors are configured to produce signals having different spatial characteristics, e.g., different patterns of constructive/destructive interference, etc. Specifically, the beamforming weight vectors are adapted to provide different degrees of antenna tilt and different beam-widths. In some embodiments, the beamforming weight vectors also provide side-lobe suppression for the resulting high-beam and low-beam signals. For example, the beamforming weight vector applied to generate the low-beam signal may provide upper side-lobe suppression, while the beamforming weight vector applied to generate the high-beam signal may provide lower side-lobe suppression. Side-lobe suppression is discussed in greater detail below. Subsequently, the embodiment method 600 proceeds to step 630, where the transmitter transmits the low-beam signal and the high-beam signal over different polarizations of an antenna array to emit a low-beam transmission signal and a high-beam transmission signal having different antenna tilts, beam-widths, and polarizations.

Figure 7:
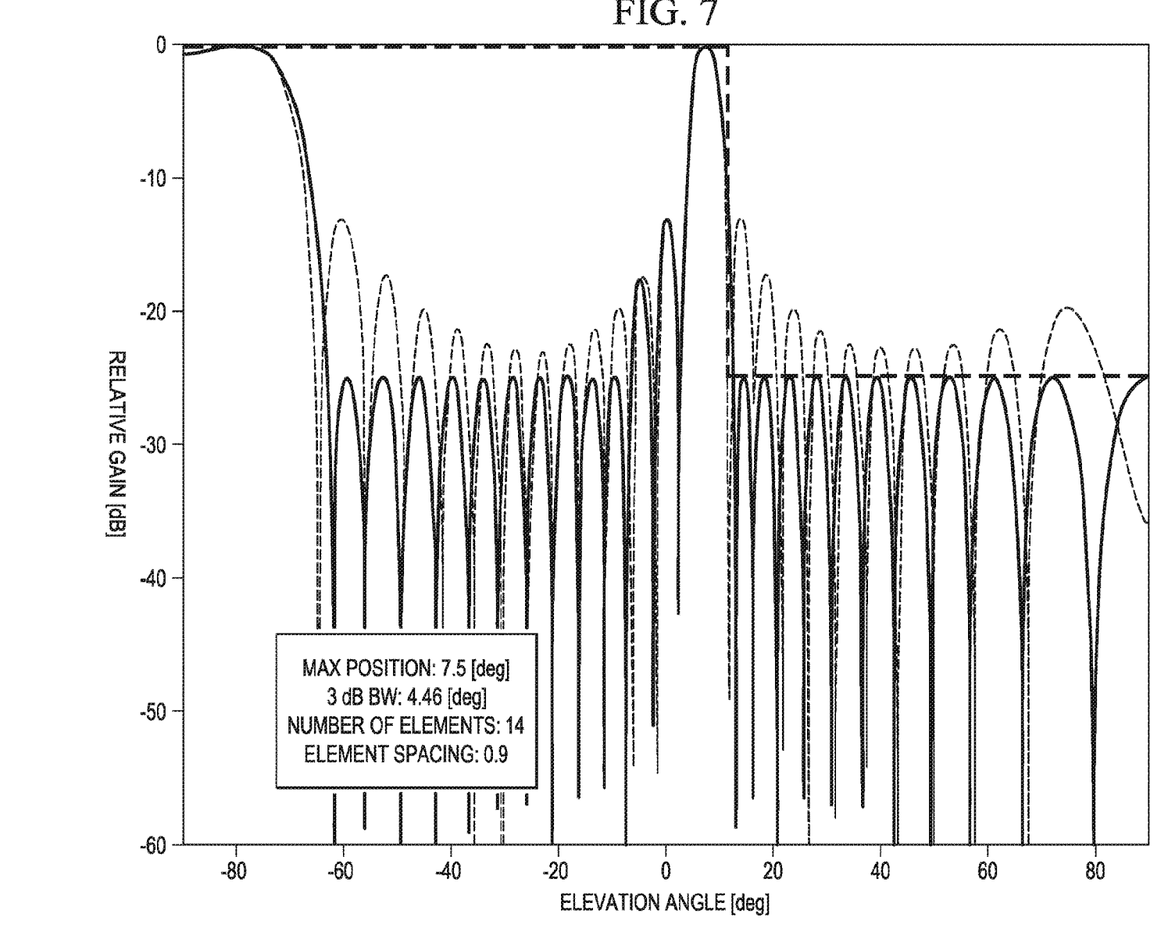
FIG. 7 illustrates a diagram of an embodiment low-beam transmission signal having upper side-lobe suppression.
Figure 8:
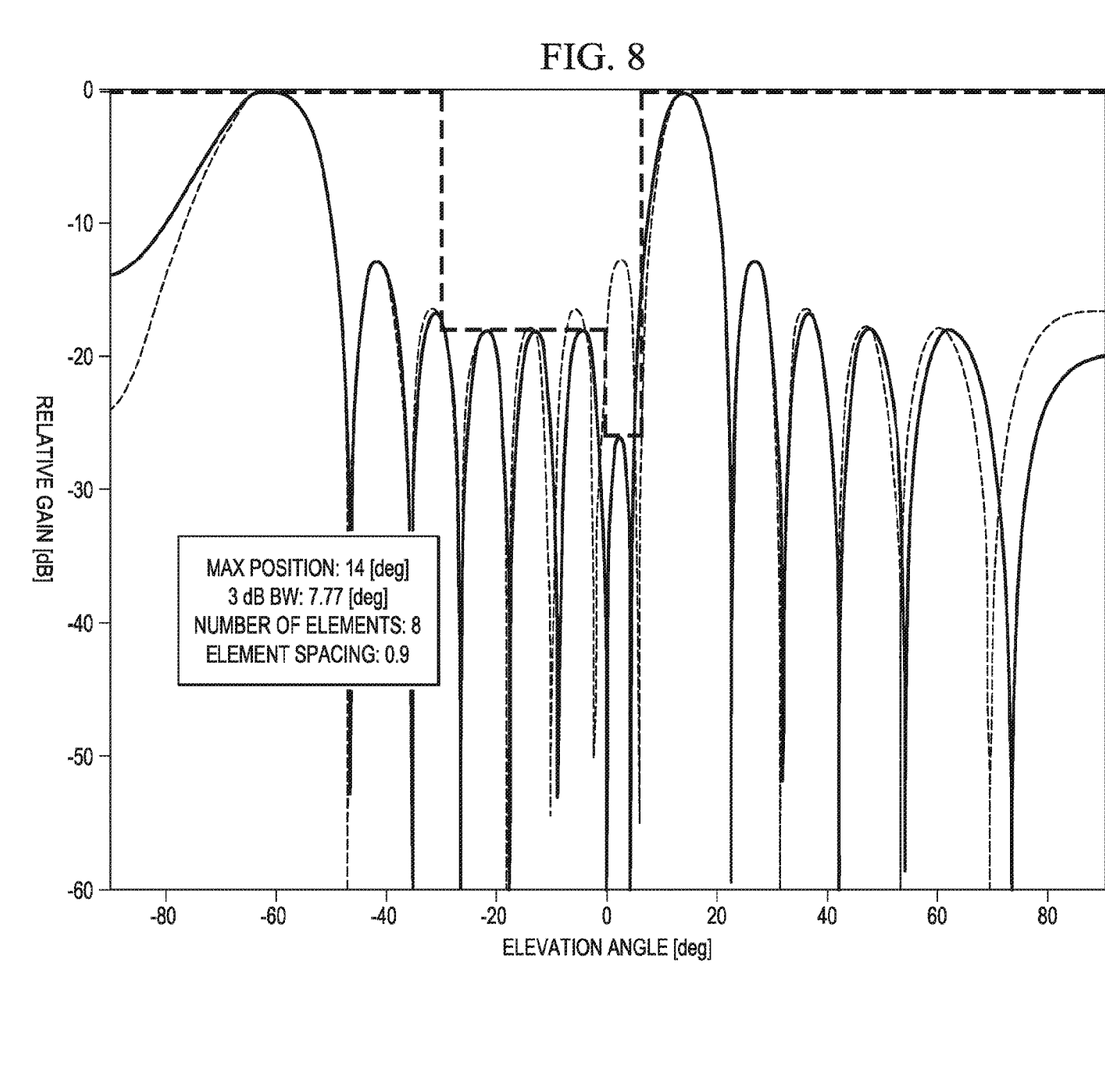
FIG. 8 illustrates a diagram of an embodiment high-beam transmission signal having lower side-lobe suppression.

As mentioned above, some embodiments may perform upper side-lobe suppression on the low-beam signal and lower side-lobe suppression on the high-beam signal to reduce interference between the resulting low-beam and high-beam transmission signals. Performing upper side-lobe suppression for the low-beam signal may suppress (e.g., reduce the transmit power) of secondary lobe(s) of the low-beam signal having the same elevation angle as a primary-lobe of the high-beam signal. Likewise, performing lower side-lobe suppression for the high-beam signal may suppress secondary lobe(s) of the high-beam signal having the same elevation angle as a primary-lobe of the low-beam signal. In some embodiments, side-lobe suppression may also suppress leading/trailing portions of the primary lobes of the low-beam and/or high-beam signal when the primary lobes of the respective high-beam and low-beam signals partially overlap, as may occur when there is a relatively small difference in their respective antenna tilts.

FIG. 7 illustrates a diagram of an embodiment low-beam signal having upper-side lobe suppression, and FIG. 8 illustrates a diagram of an embodiment high-beam signal having lower-side lobe suppression. As shown, portions of the respective signals are suppressed to reduce interference. Notably, side-lobe suppression may have substantial performance advantages for multi-user MIMO (MU-MIMO) applications, as demonstrated by the simulation results below.

Figure 9A:
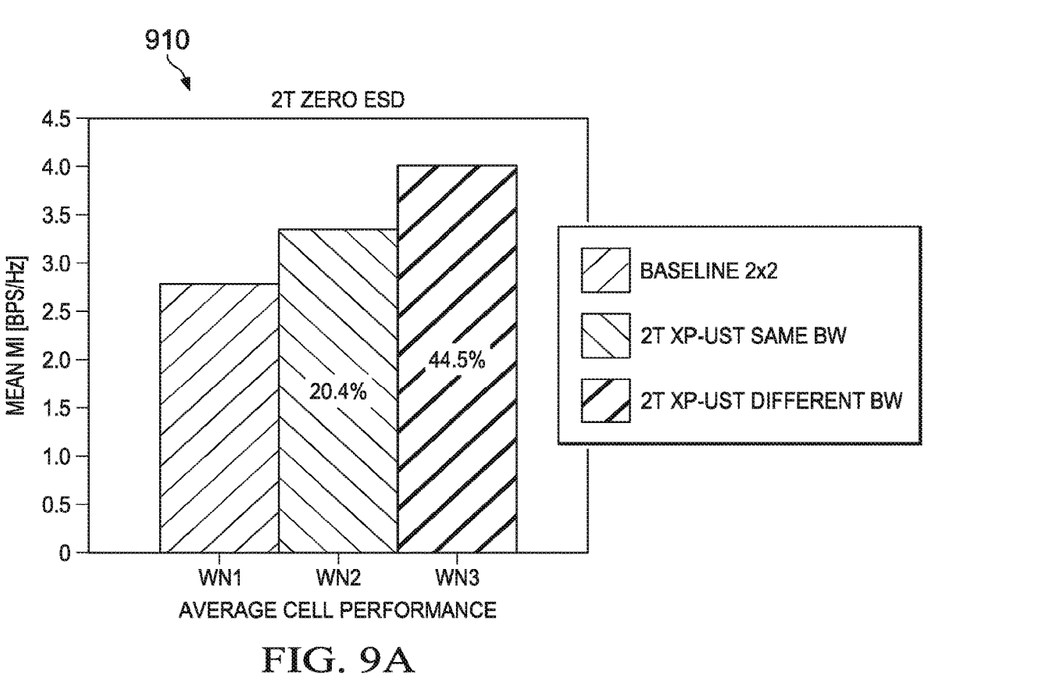
FIGS. 9A-9B illustrate charts of simulation results demonstrating performance advantages of embodiment high-beam and low-beam transmission techniques.
Figure 9B:
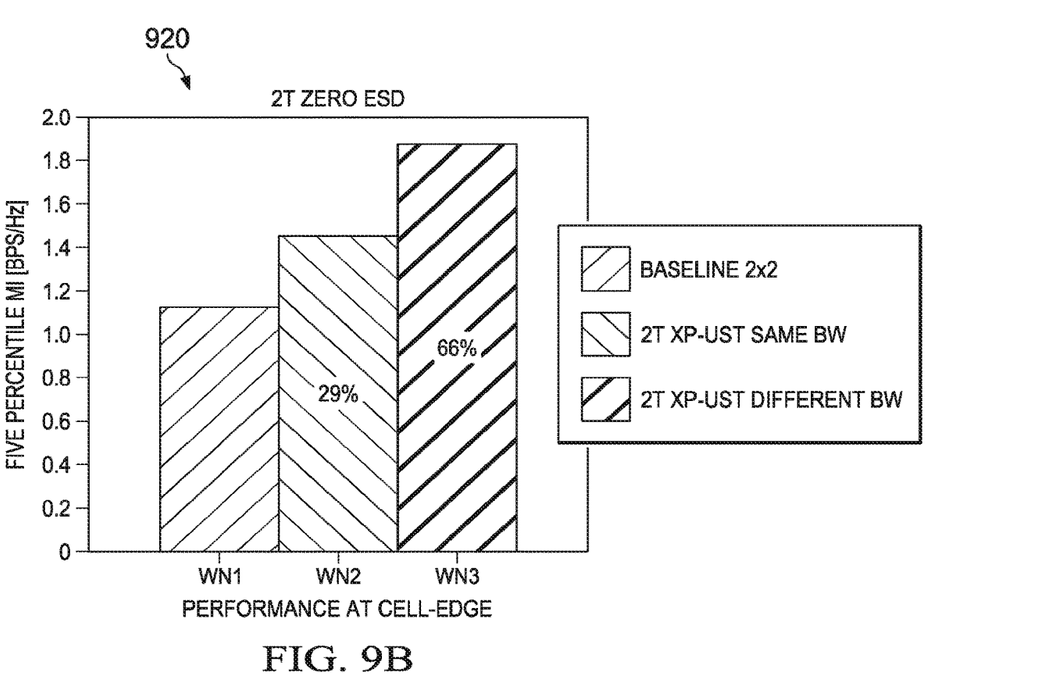

Emitting low-beam and high-beam transmission signals having different antenna tilts, beam-widths, polarizations offers substantial performance advantages. FIGS. 9A-9B illustrate charts 910, 920 of simulation results demonstrating performance advantages of embodiment high-beam and low-beam transmission techniques. Specifically, the chart 910 demonstrates average throughput rates across all user for three wireless networks, while the chart 920 demonstrates average throughput rates for cell-edge users in the three wireless networks. The first wireless network (WN1) utilizes transmission signals having different polarizations, but the same antenna tilt and beam-width, as is typical of conventional networks. The second wireless network (WN2) utilizes transmission signals having different polarizations and different antenna tilts, but the same beam-width, as is discussed in U.S. patent application Ser. No. 14/609,251. The third wireless network (WN3) is an embodiment wireless network that utilizes low-beam and high-beam transmission signals having different polarizations, different antenna tilts, and different beam-widths. As shown, WN-3 provides the best average performance, as well as the best performance at the cell-edge.

Figure 10A:
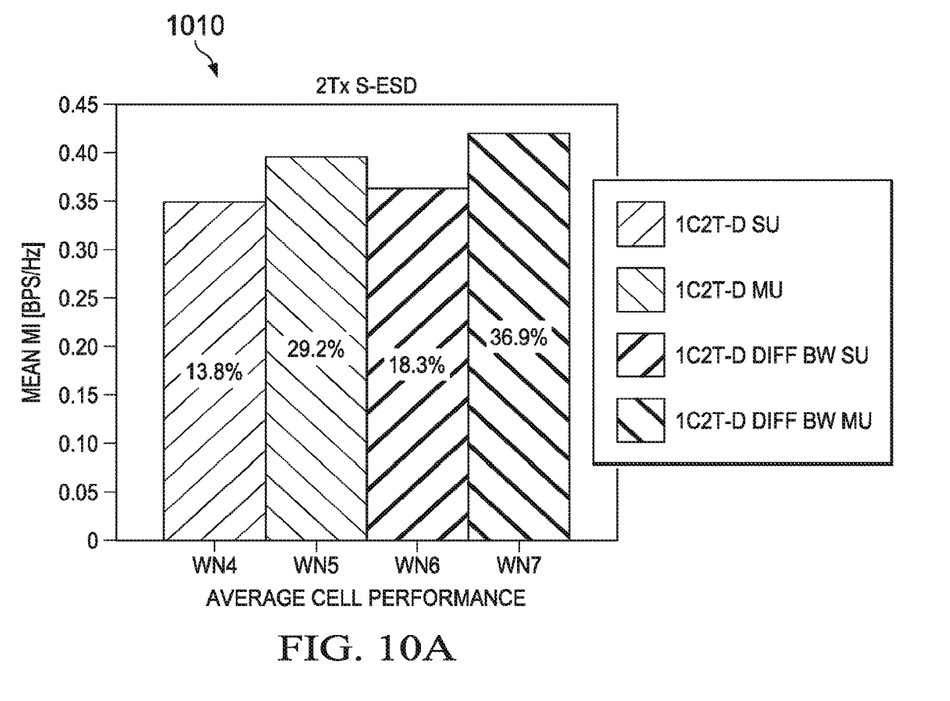
FIGS. 10A-10B illustrate charts of additional simulation results demonstrating performance advantages of embodiment high-beam and low-beam transmission techniques.
Figure 10B:
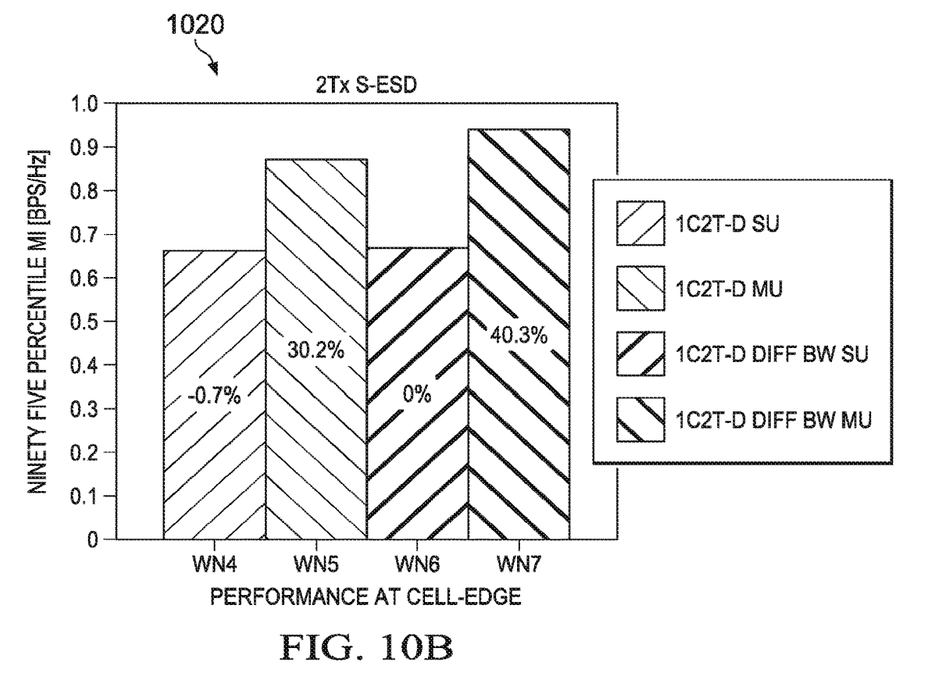

The embodiment low-beam and high-beam transmission techniques also provide advantages in single user (SU) MIMO (SU-MIMO) and multi-user MIMO (MU-MIMO) wireless networks. FIGS. 10A-10B illustrate charts 1010, 1020 of simulation results demonstrating performance advantages of embodiment high-beam and low-beam transmission techniques. Specifically, the chart 1010 demonstrates average throughput rates across all users for four MIMO wireless networks (WN4-WN7), while the chart 1020 demonstrates average throughput rates for cell-edge users in the four MIMO wireless networks. The fourth wireless network (WN4) is a conventional SU-MIMO network, and the fifth wireless network (WN5) is a conventional MU-MIMO network. The sixth wireless network (WN6) is an embodiment SU-MIMO network adapted to communicate low-beam and high-beam transmission signals having different polarizations, different antenna tilts, and different beam-widths. The seventh wireless network (WN7) is an embodiment MU-MIMO network adapted to communicate low-beam and high-beam transmission signals having different polarizations, different antenna tilts, and different beam-widths. As shown, the embodiment SU-MIMO network (WN-6) provides better performance than the conventional SU-MIMO network (WN-4) across all users, while still providing comparable performance at the cell edge. Moreover, the embodiment SU-MIMO network (WN-7) provides better performance than the conventional SU-MIMO network (WN-5) across all users, as well as at the cell edge. Additional performance gains may be achieved by dynamically manipulating the antenna patterns for the low-beam and high-beam transmission signals.

Figure 11A:
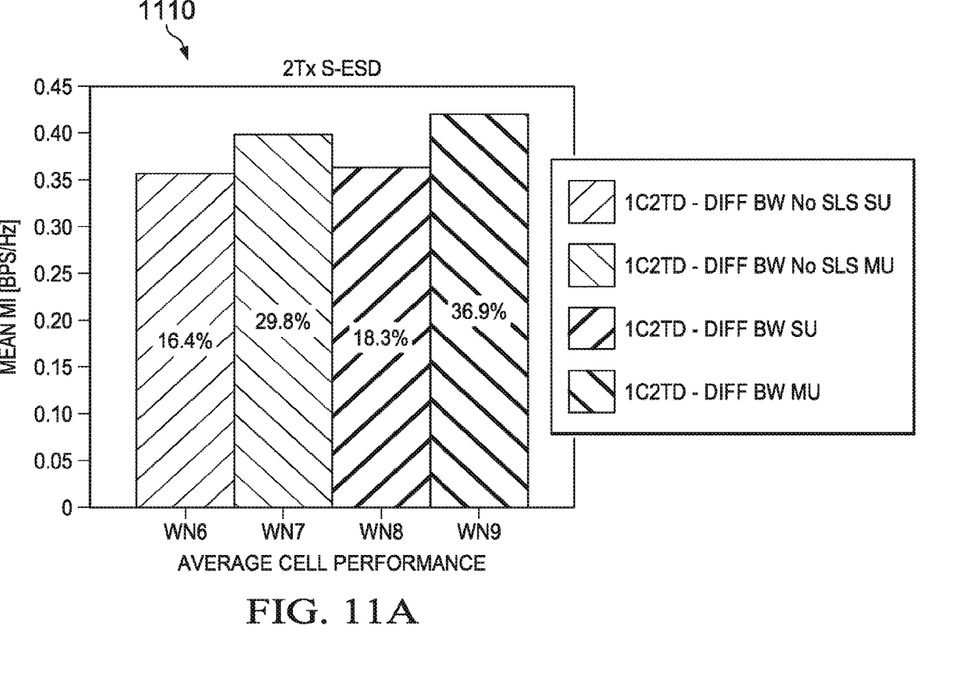
FIGS. 11A-11B illustrate charts of yet additional simulation results demonstrating performance advantages of embodiment high-beam and low-beam transmission techniques.
Figure 11B:
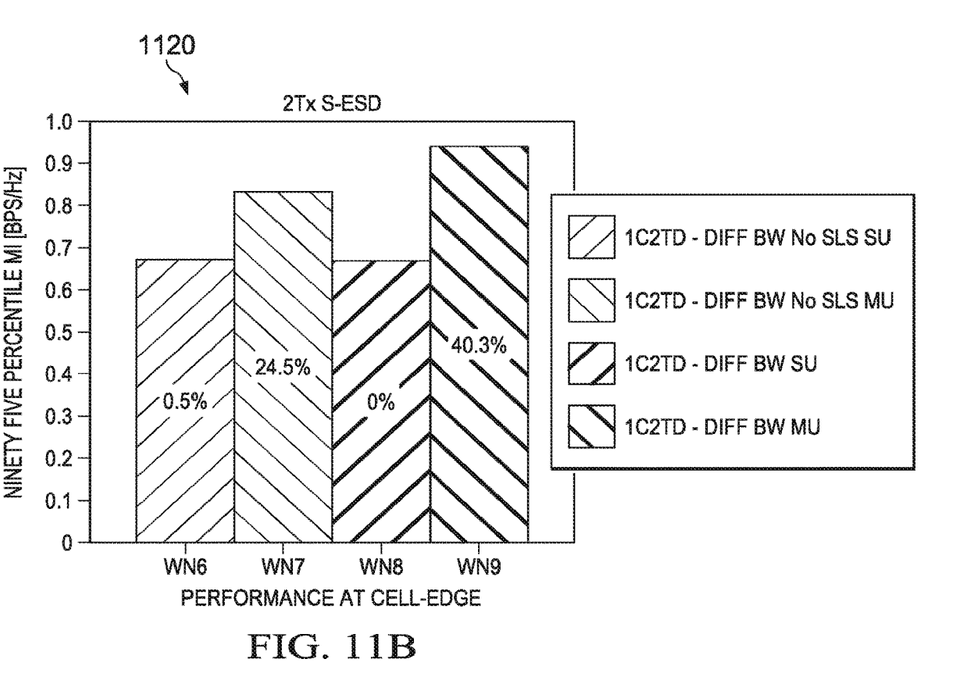

Notably, implementing side-lobe suppression to the low-beam and high-beam transmissions may further increase performance, particularly in the context of SU-MIMO and MU-MIMO networks. FIGS. 11A-11B illustrate charts 1110, 1120 of yet additional simulation results demonstrating performance advantages of embodiment high-beam and low-beam transmission techniques. The chart 1110 demonstrates average throughput rates across all users for four MIMO wireless networks (WN6-WN9), while the chart 1020 demonstrates average throughput rates for cell-edge users in the four MIMO wireless networks (WN6-WN9). The sixth wireless network (WN6) and the seventh wireless network (WN7) are the embodiment SU-MIMO and MU-MIMO networks, respectively, described above, i.e., WN6 and WN7 in FIGS. 10A-10B. The eight wireless network (WN8) is an embodiment SU-MIMO wireless network adapted to perform side-lobe suppression on the low-beam and high-beam signals, and the ninth wireless network (WN9) is an embodiment MU-MIMO wireless network adapted to perform side-lobe suppression on the low-beam and high-beam signals. As shown, the embodiment SU-MIMO network (WN8) offers slightly better performance than the embodiment SU-MIMO networks (WN6) across all user, while providing substantially the same performance at the cell edge. Additionally, it can be seen that the embodiment MU-MIMO network (WN9) offers significantly better performance than the embodiment MU-MIMO networks (WN7) both across all users and at the cell edge. Notably, the advantage derived from side-lobe suppression in MU-MIMO is more pronounced at the cell edge, than at the cell center.

Aspects of this disclosure may allow for beam steering when using two transmission streams and a single column of antenna resources, as well as using the standard release eight two transmit-stream (2T) codebook. Additional capacity increases may be derived through beam shaping.

Figure 12:
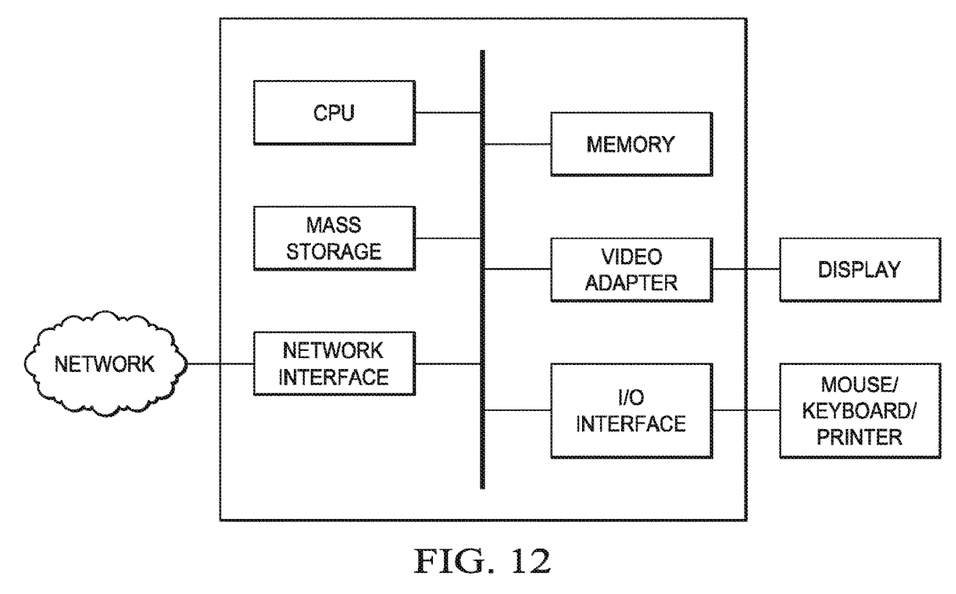
FIG. 12 illustrates a diagram of an embodiment computing platform.

FIG. 12 illustrates a block diagram of a processing system that may be used for implementing the devices and methods disclosed herein. In an embodiment, the processing system is included in an access point adapted to transmit the high-beam and low-beam transmission signals discussed above. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 13:
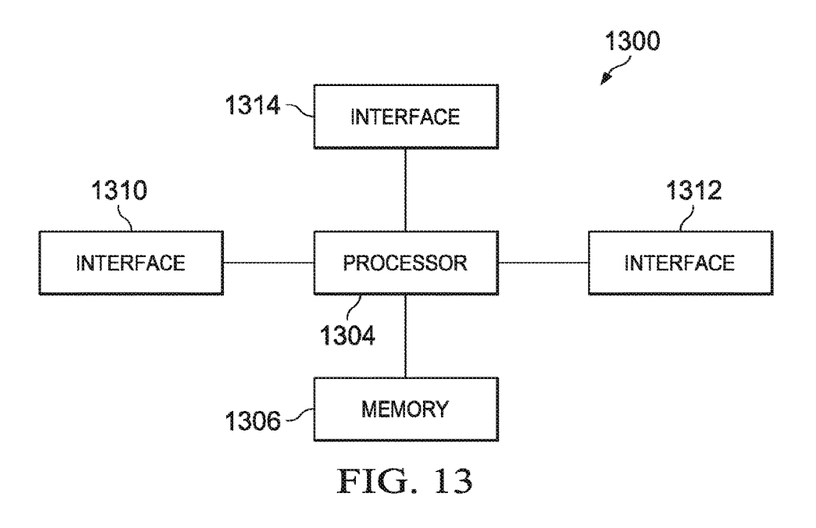
FIG. 13 illustrates a diagram of an embodiment communications device.

FIG. 13 illustrates a block diagram of an embodiment of a communications device 1300, which may correspond to an access point adapted to transmit the high-beam and low-beam transmission signals discussed above. In an embodiment, the communications device 1300 is an access point adapted to perform high-beam and low-beam transmissions having different antenna tilts, beam-widths, polarizations than one another. The communications device 1300 may include a processor 1304, a memory 1306, a plurality of interfaces 1310, 1312, 1314, which may (or may not) be arranged as shown in FIG. 13. The processor 1304 may be any component capable of performing computations and/or other processing related tasks, and the memory 1306 may be any component capable of storing programming and/or instructions for the processor 1304. The interfaces 1310, 1312, 1314 may be any component or collection of components that allows the communications device 1300 to communicate with another device.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. An access point (AP) in a wireless network, the AP comprising:
a common cross-polarized antenna; and
a radio transmitter coupled to the common cross-polarized antenna, the radio transmitter configured to concurrently transmit a low-beam signal and a high-beam signal over a common cross-polarized antenna to emit a low-beam transmission signal and a high-beam transmission signal, the low-beam transmission signal having more antenna down-tilt and a different polarization than the high-beam transmission signal,
wherein the low-beam transmission signal has a wider beam width than the high-beam transmission signal such that a beam-width angle of the low-beam transmission signal is at least one-degree wider than a beam-width angle of the high-beam transmission signal, the beam-width angle of the low-beam transmission signal being an angle between negative three decibel ((−3 dB)) points of the main lobe of the low-beam transmission signal, and the beam-width angle of the high-beam transmission signal being an angle between (−3 dB) points of the main lobe of the high-beam transmission signal.

2. The AP of claim 1, wherein the beam-width angle of the low-beam transmission signal is at least three degrees wider than the beam-width angle of the high-beam transmission signal.

3. The AP of claim 1, wherein the beam-width angle of the low-beam transmission signal is at least six degrees wider than the beam-width angle of the high-beam transmission signal.

4. The AP of claim 1, wherein the beam-width angle of the low-beam transmission signal is at least ten degrees wider than the beam-width angle of the high-beam transmission signal.

5. The AP of claim 1, wherein the beam-width angle of the low-beam transmission signal is at least fifty percent wider than the beam-width angle of the high-beam transmission signal.

6. The AP of claim 1, wherein the beam-width angle of the low-beam transmission signal is at least twice as wide as the beam-width angle of the high-beam transmission signal.

7. The AP of claim 1, wherein the low-beam transmission signal and the high-beam transmission signal are linearly polarized signals having different electromagnetic field (E-field) polarization angles with respect to the y-axis, the y-axis corresponding to a vertically polarized wave.

8. The AP of claim 7, wherein the low-beam transmission signal and the high-beam transmission signal have orthogonal E-field polarization angles.

9. The AP of claim 8, wherein the high-beam transmission signal comprises a forty-five degree E-field angle with respect to the y-axis, and the low-beam transmission signal comprises a negative forty-five degree E-field angle with respect to the y-axis, or
wherein the high-beam transmission signal comprises a negative forty-five degree E-field angle with respect to the y-axis, and the low-beam transmission signal comprises a forty-five degree E-field angle with respect to the y-axis.

10. The AP of claim 8, wherein the high-beam transmission signal comprises a vertically polarized signal, and the low-beam transmission signal comprises a horizontally polarized signal, or
wherein the high-beam transmission signal comprises a horizontally polarized signal, and the low-beam transmission signal comprises a vertically polarized signal.

11. The AP of claim 1, wherein the high-beam transmission signal comprises a forty-five degree electromagnetic field (E-field) polarization angle with respect to the y-axis, an eight degree antenna down tilt, and a four degree beam-width, and
wherein the low-beam transmission signal comprises a negative forty-five degree electromagnetic field (E-field) polarization angle with respect to the y-axis, a fourteen degree antenna down tilt, and an eight degree beam-width, the y-axis corresponding to a vertically polarized wave.

12. The AP of claim 1, wherein the low-beam transmission signal and the high-beam transmission signal are circularly or elliptically polarized signals having different electromagnetic field (E-field) polarization angles with respect to the x-axis and the y-axis at a given point in space and time, the y-axis corresponding to a vertically polarized wave, and the x-axis corresponding to a horizontally polarized wave.

13. The AP of claim 1, wherein the radio transmitter is further configured to:
generate the low-beam signal by applying a first beamforming weight vector to a first component signal; and
generate the high-beam signal by applying a second beamforming weight vector to a second component signal, wherein the first beamforming weight vector provides upper side-lobe suppression for the low-beam signal, and wherein the second beamforming weight vector provides lower side-lobe suppression for the high-beam signal.

14. The AP of claim 13, wherein the first beamforming weight vector provides upper side-lobe suppression for the low-beam signal by suppressing a secondary lobe of the low-beam signal having the same elevation angle as a primary-lobe of the high-beam signal, and
wherein the second beamforming weight vector provides lower side-lobe suppression for the high-beam signal by suppressing a secondary lobe of the high-beam signal having the same elevation angle as a primary-lobe of the low-beam signal.

15. The AP of claim 13, wherein the radio transmitter transmits the low-beam signal and the high-beam signal over the common cross-polarized antenna as a single-user multiple-input-multiple-output (SU-MIMO) signal.

16. The AP of claim 13, wherein the radio transmitter transmits the low-beam signal and the high-beam signal over the common cross-polarized antenna as a multi-user multiple-input-multiple-output (MU-MIMO) signal.

17. The AP of claim 16, wherein the MU-MIMO signal carries a first data packet to a first user equipment (UE) via the low-beam transmission signal and a second data packet to a second UE via the high-beam transmission signal, the first data packet and the second data packet being communicated over the same time-frequency resources.

18. A method comprising:
concurrently transmitting a low-beam signal and a high-beam signal over a common cross-polarized antenna to emit a low-beam transmission signal and a high-beam transmission signal, the low-beam transmission signal having more antenna down-tilt and a different polarization than the high-beam transmission signal,
wherein the low-beam transmission signal has a wider beam width than the high-beam transmission signal such that a beam-width angle of the low-beam transmission signal is at least one-degree wider than a beam-width angle of the high-beam transmission signal, the beam-width angle of the low-beam transmission signal being an angle between negative three decibel (−3 dB)) points of the main lobe of the low-beam transmission signal, and the beam-width angle of the high-beam transmission signal being an angle between −3 dB points of the main lobe of the high-beam transmission signal.

19. The method of claim 18, wherein the beam-width angle of the low-beam transmission signal is at least three degrees wider than the beam-width angle of the high-beam transmission signal.

20. The method of claim 18, wherein the beam-width angle of the low-beam transmission signal is at least six degrees wider than the beam-width angle of the high-beam transmission signal.

21. The method of claim 18, wherein the beam-width angle of the low-beam transmission signal is at least ten degrees wider than the beam-width angle of the high-beam transmission signal.

* * * * *